United States Patent [19]
Monforte

[11] Patent Number: 4,852,928
[45] Date of Patent: * Aug. 1, 1989

[54] ROBOTIC END EFFECTORS

[75] Inventor: Mathew L. Monforte, Hamilton, N.J.

[73] Assignee: Multivisions Corporation, Bound Brook, N.J.

[*] Notice: The portion of the term of this patent subsequent to May 27, 2003 has been disclaimed.

[21] Appl. No.: 178,524

[22] Filed: Apr. 7, 1988

Related U.S. Application Data

[63] Continuation-in-part of Ser. No. 837,749, Mar. 10, 1986, abandoned, which is a continuation of Ser. No. 580,715, Feb. 16, 1984, Pat. No. 4,591,198.

[51] Int. Cl.$^4$ ............................................. B25J 15/08
[52] U.S. Cl. .................................. 294/88; 294/119.1; 294/902; 294/907; 901/37; 901/39; 901/47
[58] Field of Search .................. 294/67.3, 67.33, 81.54, 294/81.62, 86.4, 88, 93, 103.1, 119.1, 119.3, 902, 907; 29/568; 414/1, 4, 730, 741, 744 A, 751; 623/57, 65; 901/30–39, 41–43, 46, 47

[56] References Cited

U.S. PATENT DOCUMENTS

| | | | |
|---|---|---|---|
| 4,042,122 | 8/1977 | Espy et al. | 294/86.4 X |
| 4,132,318 | 1/1979 | Wang et al. | 294/86.4 X |
| 4,336,926 | 6/1982 | Inagaki et al. | 294/119.1 X |
| 4,479,673 | 10/1984 | Inaba et al. | 294/119.1 X |
| 4,591,198 | 5/1986 | Monforte | 294/88 |
| 4,620,362 | 11/1986 | Reynolds | 901/30 X |

FOREIGN PATENT DOCUMENTS

| | | | |
|---|---|---|---|
| 45174 | 2/1982 | European Pat. Off. | 901/47 |
| 110557 | 8/1979 | Japan | 294/88 |
| 138271 | 10/1979 | Japan | 294/119.1 |
| 8300651 | 3/1983 | PCT Int'l Appl. | 294/86.4 |
| 8404723 | 12/1984 | PCT Int'l Appl. | 901/47 |
| 770788 | 10/1980 | U.S.S.R. | 294/902 |
| 887157 | 12/1981 | U.S.S.R. | 294/907 |
| 889423 | 12/1981 | U.S.S.R. | 294/902 |

OTHER PUBLICATIONS

IBM Technical Disclosure Bulletin, vol. 23, No. 11, Apr. 1981, "Linear Robotic Gripper" by Cummins et al.

Primary Examiner—Johnny D. Cherry
Attorney, Agent, or Firm—Sachs & Sachs

[57] ABSTRACT

An end effector suitable for use on a robotic arm associated therewith and coupled to a computer includes a universal mounting plate permitting the end effector to be mounted on the distal end of a robotic arm; a gripper mechanism slideably retained within the end effector is responsive to electronic command signals permitting the finger members disposed therein to acquire, lock and release, a plurality of tools and components upon receiving computer controlled electronic command signal. The electronic command signal controls the driving power from a power source which is coupled to the end effector.

11 Claims, 6 Drawing Sheets

ROBOTIC END EFFECTORS

The present patent application is a continuation-in-part application of patent application Ser. No. 837,749, filed on Mar. 10, 1986, now abandoned, which application is a Continuation application of parent application Ser. No. 580,715, filed on Feb. 16, 1984, which matured into U.S. Pat. No. 4,591,198 on May 27, 1986.

BACKGROUND OF THE INVENTION

1. Field of the Invention

The present invention relates to robotic end effectors, and more particularly, to a relatively small, lightweight, end effector having a pair of hollow gripping fingers which are suitable for engaging, retaining and releasing a plurality of tools and components.

2. Discussion of the Relevant Art

The art abounds with end effectors utilized in combination with robots to perform a plurality of operations in automatic production lines. Numerous types of end effectors, each designed for a specific function, are in use today. The automatic production lines require numerous robots each performing their function in sequence so that the item being manufactured moves through numerous stations, each station adding a component or performing an operation on the article being manufactured until the article reaches the end of the production line where it is then tested and packaged for shipment.

In order to improve the versatility of the end effectors numerous designs have been attempted which have as a design goal providing three degrees of freedom to the end effector and robotic arm combination permitting manipulation similar to that accomplished by a human arm and hand. Typical of an end effector having force sensors in each finger together with a system providing three degrees of freedom force sensors on each finger utilizing strain gages to measure forces on the fingers as it contacts an article is disclosed in U.S. Pat. No. 4,132,318 issued to S.S. Wang, et al on Jan. 2, 1979. The device disclosed therein is capable of measuring the gripping force and a force vector applied to the object being held by a manipulator finger of the end effector. The end effector disclosed therein is computer controlled and utilizes the strain gages and offset forces to direct the fingers of the end effector to accomplish the desired goal. The type of functions that can be performed with this type of end effector are limited.

In U.S. Pat. No. 3,905,632 issued to H. J. Caylor, et al on Sept. 16, 1975 a gripping head apparatus is disclosed that is designed to be attached to the free end of a lifting boom structure which is configured to grip, position, empty and release containers wherein the head comprises a pair of movably mounted lifting arms arranged in opposed alignment in relation to one another. A rack and pinion arrangement is used to rotate the position of the container once it is picked up by the end effector. The device disclosed herein is utilized for the singular purpose of raising a container, moving it to a new position and then tilting it so the contents thereof can be emptied. The apparatus is designed for use with relatively large containers and would be unsuitable for handling the manipulated of small devices or performing specific functions on relatively small components.

Another mechanism utilized as an end effector on a robotic arm suitable for gripping rigid products is disclosed in U.S. Pat. No. 3,655,232 issued to G. A. Martelee on Apr. 11, 1972. The embodiment disclosed therein utilizes a horizontal ram and from which are suspended hollow vertical telescoping grasping arms each housing a vertical cylindrical ram connected to a compressed oil accumulator that supplies oil to the horizontal ram and to a rotating ram about the vertical suspension pivot. Here again, the device utilizes rack and pinion arrangements which are not suitable for the manipulative functions of which the instant invention is capable.

The apparatus disclosed in the instant invention overcomes the shortcomings found in the prior art by providing an end effector suitable for use on the distal end of a robotic arm capable of performing numerous functions and is capable of engaging and releasing numerous tool elements to aid in performing a plurality of functions while maintaining its small size and weight.

Therefore, it is the object of the present invention to provide a robotic end effector that is relatively small in size, reliable and suitable for performing numerous functions.

It is yet another object of the present invention to provide a robotic end effector suitable for mounting on a plurality of robotic arms.

It is still yet another object of the present invention to provide a robotic end effector that is small in size and provides a relatively large gripper dimension.

It is still yet another object of the present invention to provide a robotic end effector that is capable of bi-directional linear motion suitable for engaging the outer dimension of objects in addition to the inner dimension thereof.

It is still yet another object of the present invention to provide a robotic end effector suitable of engaging and exchanging numerous tool elements.

It is still yet another object of the present invention to provide a robotic end effector that is capable of automatically changing and replacing tool elements and is capable of performing numerous functions.

It is still yet another object of the present invention to provide a robotic end effector capable of sensing when the object it is to engage is in the correct position for engagement thereof.

It is still yet another object of the present invention to provide a sensing arrangement for the robotic end effector providing information to the control computer for the robot that the end effector has not encountered an object in its path and/or has moved to a prescribed position and is ready to perform it function.

SUMMARY OF THE INVENTION

An end effector suitable for use on a robotic arm coupled to a central computer capable of providing an electronic command signal and a power source, according to the principles of the present invention, comprises in combination; attachment means for removably affixing the end effector to the distal end of the robotic arm; a gripper apparatus which includes a pair of finger members having a hollow body portion slideably retained within the end effector, the pair of finger members being adapted to be coupled, via a driving apparatus to a power source and cooperate with and removably retain and release a plurality of end effector tools and components upon receiving an electronic command signal; each of said finger members is provided with a least one through aperture that functions as an indexing means and a computer for generating the command signal, the command signal being coupled to the finger members for controlling the application of driving power from a power source.

The foregoing and other objects and advantages will appear from the description to follow. In the description reference is made to the accompanying drawing which forms a part hereof, and on which is shown by way of illustration a specific embodiment in which the invention may be practiced. The embodiment will be described in sufficient detail to enable those skilled in the art to practice the invention and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWING

In order that the invention may be more fully understood, it will now be described by way of example, with reference to the accompanying drawing in which.

DESCRIPTION OF THE PREFERRED EMBODIMENT

Figure 1:
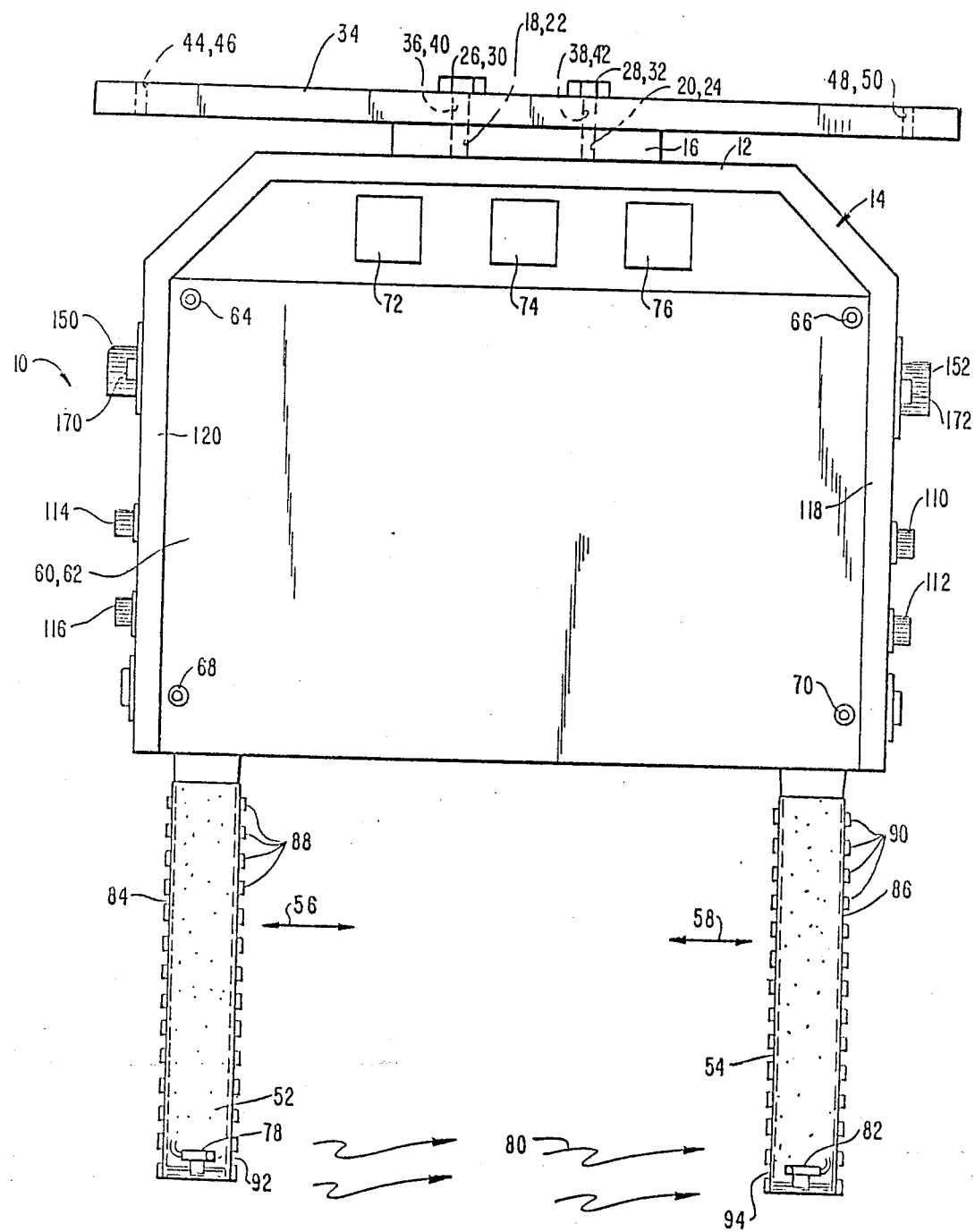
FIG. 1 is a front view in elevation of a robotic end effector, according to the principles of the present invention.
Figure 2:
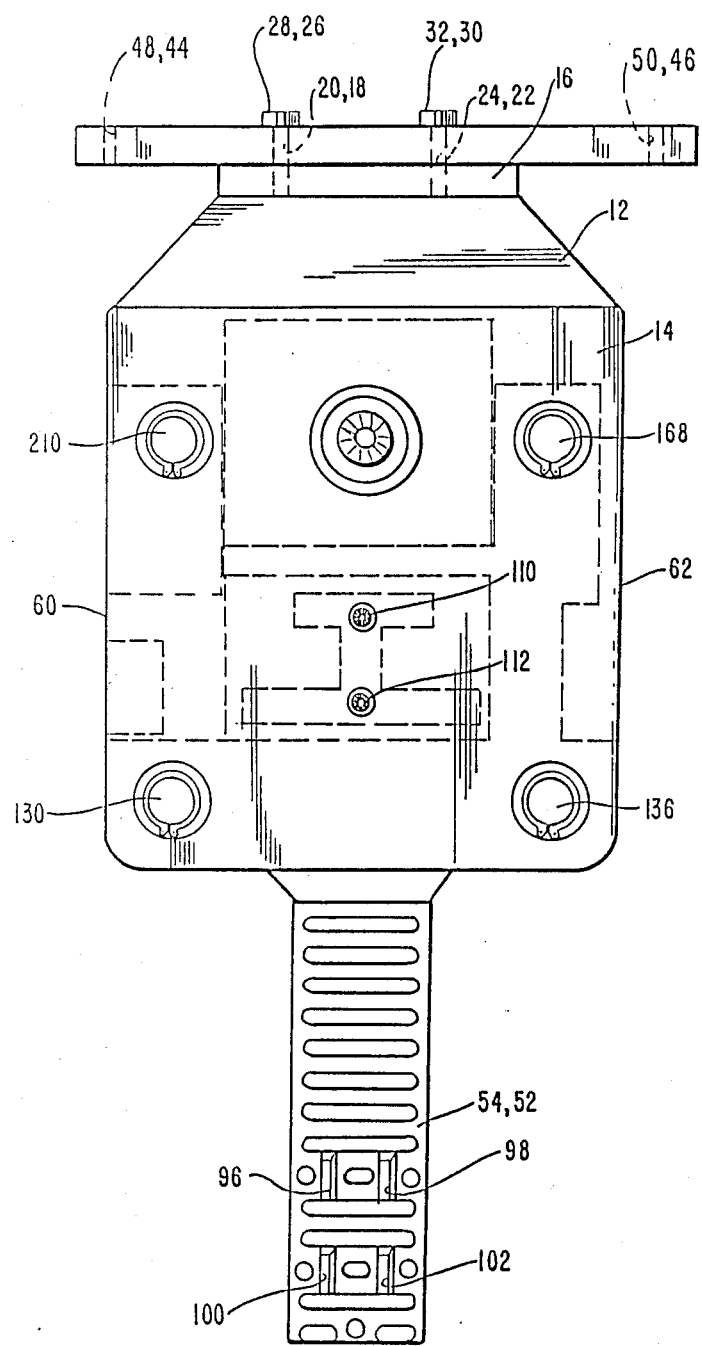
FIG. 2 is an end view in elevation of the robotic end effector shown in FIG. 1 showing one indexing embodiment.

Referring now to the figures, and in particular, to FIGS. 1 and 2, there is shown a front view in elevation and a side view in elevation of an end effector 10, according to the principles of the present invention. The upper portion 12 of the housing 14 of the end effector 10 is provided with a reinforced portion 16 that is provided with threaded apertures 18, 20, 22, and 24 therein which are adapted to receive threaded bolts 26, 28, 30 and 32 used to affix a universal mounting plate 34 to the reinforced portion 16 of the end effector 20. The universal mounting plate 34 is provided with through apertures 36, 38, 40 and 42 which are adapted to cooperate with and receive bolts 26, 28, 30 and 32 to enable universal mounting plate 34 to be mounted on end effector 10. Through apertures 44, 46, 48 and 50 provided in universal mounting plate 34 permit the end effector 10 to be affixed to the distal end 159 of different types of robotic arms 163 such, as for example, bolts 26, 28, 30 and 32. Thus, by providing proper mounting holes in the universal plate 34 the end effector 10 may be affixed to known robotic arms or by changing plate 34 the mounting holes can be configured to any desired application.

The end effector 10 is provided with a pair of hollow gripped fingers 52 and 54 that extend outwardly from the hollow housing 14. The hollow housing 14 is generally U-shaped and open on the bottom so that the gripper fingers may freely move in the direction of arrows 56 and 58. Each of the gripper fingers 52 and 54 move linearly inwardly and outwardly (bi-directionally) simultaneously, as will be explained hereinafter.

The open front and rear portions of the housing 14 are provided with covers 60 and 62 which are fastened to the housing by means of screws 64, 66, 68 and 70, in a conventional manner. The upper portion of housing 14 may also include indicator lights 72, 74 and 76, which may be used to indicate that the light emitting device 78 disposed within the distal end of hollow gripper finger 52 which provides an infra-red light beam 80 that is received by the photoelectric detector 82 disposed in the hollow distal end of gripper finger 54, has been interrupted by an object being interposed therebetween. In addition to illuminating lamp 72 an electronic signal may be sent to the main computer 161 that the object to be captured is in position so that the computer may initiate the proper signal to perform the next function of the end effector (e.g. close fingers 52 and 54). Indicator light 74 may be utilized to indicate when a tool has been engaged and is in position as well as provide the necessary signal to the main computer to initiate the next function. In a similar manner, indicator light 76 is illuminated to indicate that the component part has been capture by the tool as will be explained hereinafter, also providing information to the main computer that the end effector 10 is available for its succeeding function.

Preferably, the finger grippers 52 and 54 are covered with resilient boot members 84 and 86 that are provided with a plurality of protrusions 88 and 90, respectively, that increase the surface friction so that the fingers may more readily grip and retain a component or article which it attempts to capture. Apertures 92 and 94 are provided in the boot member 84 and 86, respectively, to prevent interference with the infra-red rays emanating from the light emitting device 78 to the photoelectric detector 82. Gripper fingers 54 and 52 are each provided with alignment means or indexing, which comprise elongated through apertures 96, 98, 100 and 102 proximate the distal end thereof, the function of which will become apparent in the description which follows.

Figure 3:
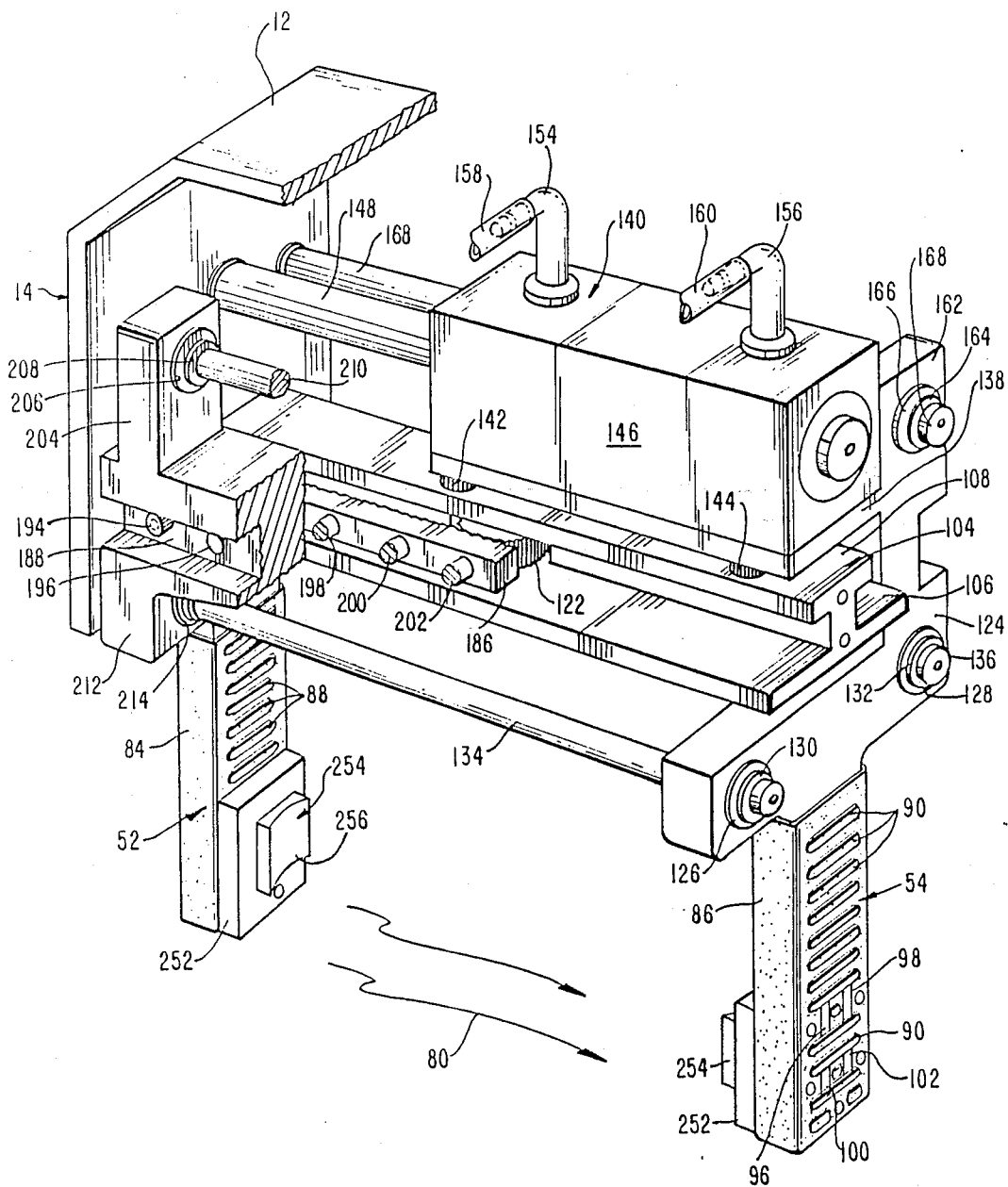
FIG. 3 is an isometric view, partially broken away, of the robotic end effector shown in FIG. 1.

Referring now to FIG. 3, which is an isometric views partially broken away, of the embodiment disclosed in FIGS. 1 and 2. The generally U-shaped housing 14, with its upper portion 12 being closed (inverted U) has a centrally, longitudinally disposed shaft 104 which, when shown in cross-section, resembles an I-beam with the lower portion 106 thereof being slightly larger in size than the upper portion 108. Shaft 104 is held in position by screws 110 and 112 in one arm portion 118 (FIG. 1) of the housing 14 while the other end is held in position by screws 114 and 116 inserted through apertures provided in the other are portion 120 of housing 14 (see FIGS. 1, 2, 3 and 4). Preferably, shaft 104 is centrally disposed in the housing 14 and also provides structural reinforcement. Centrally disposed in the shaft 104 is a pinion gear 122 which has its axis perpendicular to the axis of shaft 104 and rotates in a plane parallel to the upper and lower portions 106 and 108 of I-beam 104. Pinion gear 122 may be installed with a free wheeling bushing 123 in order to provide minimum frictional losses during rotation thereof. The upper portion 124 of gripper finger 54 is disposed transverse to the axis of shaft 104 and has two apertures 126 and 128 provided proximate the outwardly extending arms thereof into which are mounted circulating ball bushings 130 and 132. Ball bushings such as that manufactured by the Heim Corporation of the State of Connecticut, Model number 887X 250SS are adapted to receive guide shafts 134 and 136 therein, respectively. Thus, gripper finger 54 may freely slide along and be guided by shafts 134 and 136.

Figure 1A:
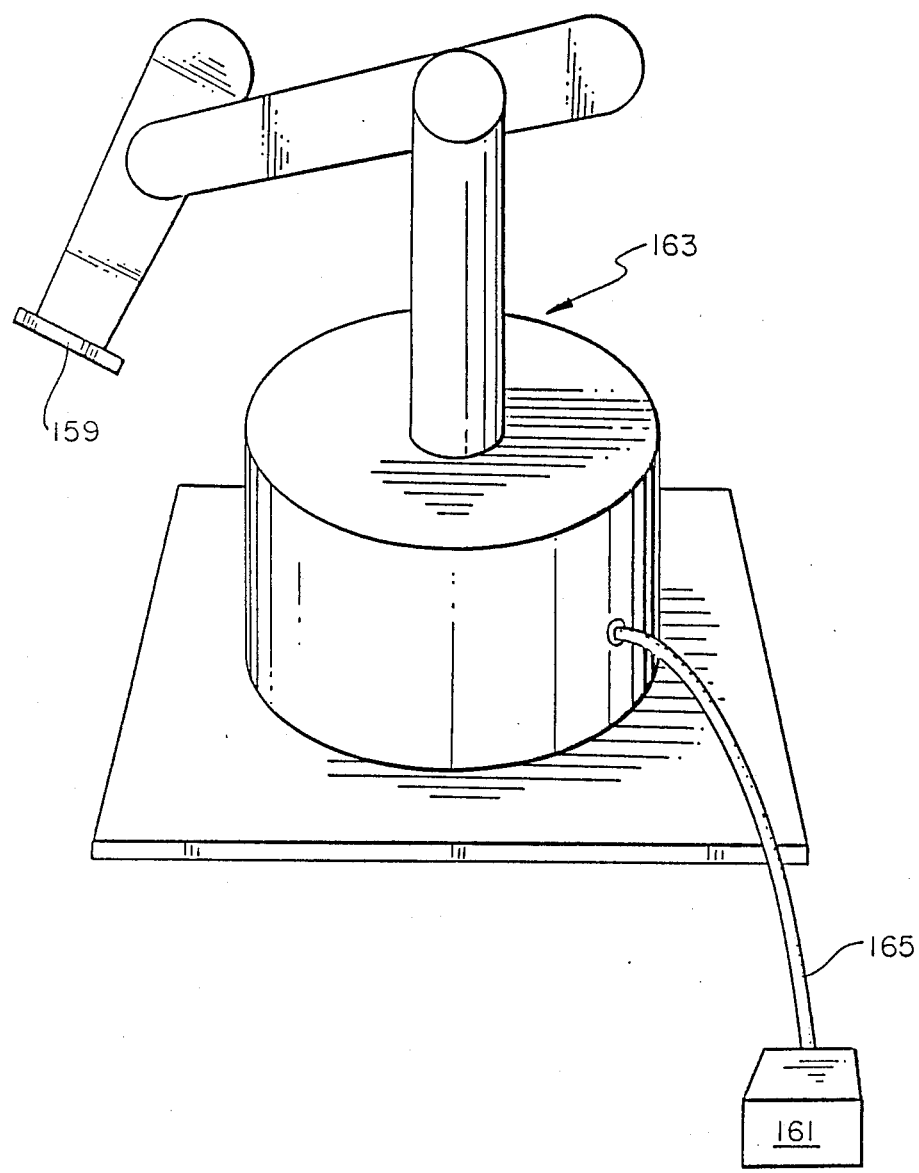
FIG. 1A is a pictorial representation of a control computer coupled to a robot having a robotic arm with an end effector disposed on the distal end thereof.

Extending upwardly from the transverse upper portion 124 is a shelf portion 138 upon which a pneumatic double acting cylinder 140 is mounted by means of two pairs of screws 142 and 144 that engage the housing portion 146 of the cylinder 140 thereby affixing the housing of the cylinder with respect to finger 54. A typical cylinder suitable for this application is manufactured by Compact Air Products of Westminster, S. C., Model No. BD118X2-EXD12118. The cylinder 140, being of the double acting type is provided with a centrally disposed rod 148 which extends outwardly from either end of the cylinder and is provided with a central bore on both ends adapted to receive screws 150 and 152 (FIG. 1), which extend through the arm portions 118 and 120 (FIG. 4) of the housing 14 thereby affixing the rod with respect thereto. Thus, it can be seen that by activation of the double acting cylinder 140, the housing 146 thereof can be moved from one end to the other of the rod while the rod remains stationary. Activation or movement of the housing 146 is accomplished by the application of a fluid under pressure, e.g., compressed air, entering, via input nozzle 154 or 156. Input nozzles 154 and 156 are coupled, via a flexible hose 158 and 160, respectively, to a source of compressed air, not shown, the direction of which is electronically controlled by a signal from the central computer 161 coupled to the robot 163, via cabling 165 shown in FIG. 1A.

The shelf portion 138 of gripper finger 54 is additionally provided with an upwardly extending portion 162 which is provide with an aperture 164 into which is mounted a circulating ball bushing 166 adapted to receive a guide shaft 168 therein which is affixed to the arm portions 118 and 120 of housing 14 by means of two screws 170 and 172 in a manner similar to that utilized for guide shafts 134 and 136.

Figure 4:
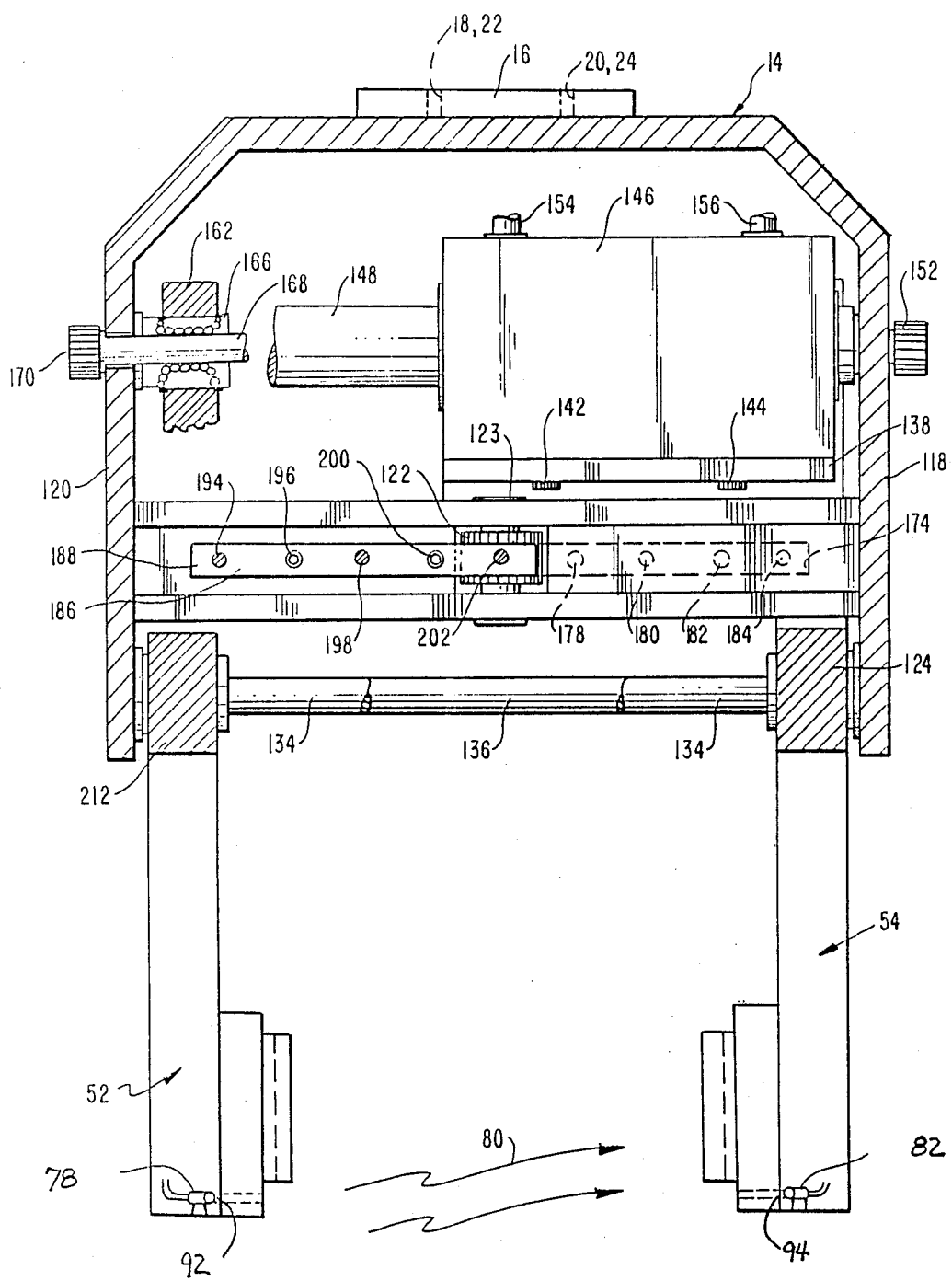
FIG. 4 is a view in elevation, partially broken away, of the end effector shown in FIG. 3.
Figures 5, 7, 8:
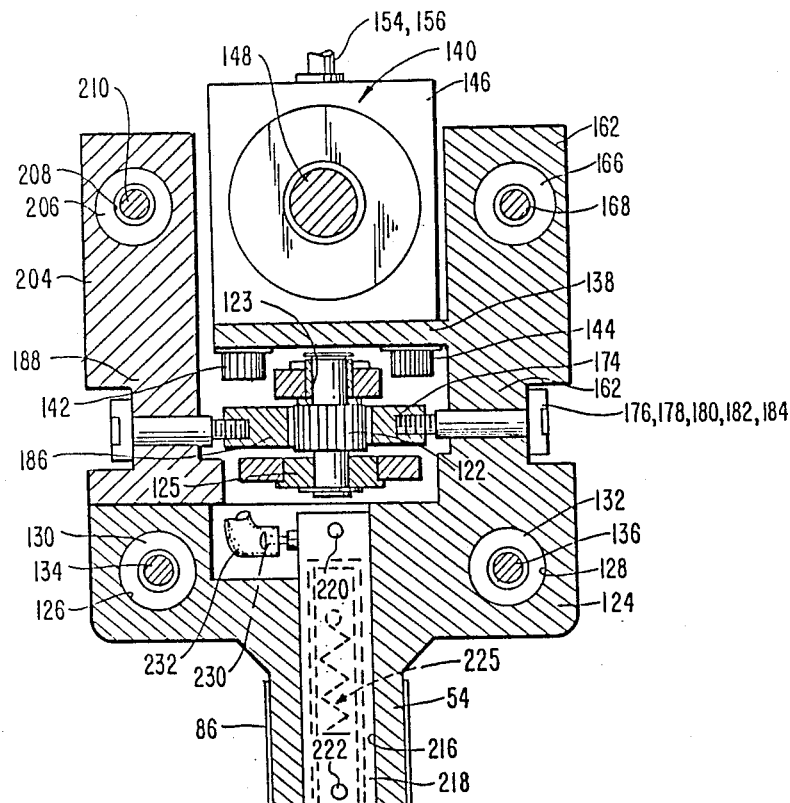
FIG. 5 is a cross-section view in elevation of the end effector with portions broken away, in order to more clearly point out the features of the instant invention.
FIG. 7 is a front view in elevation showing the engaging pins of a typical tool.
FIG. 8 is a side view in elevation of the tool shown in FIG. 7.
Figure 6:
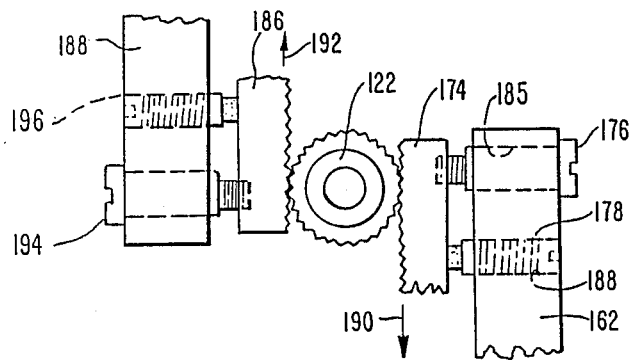
FIG. 6 is a partial top plan view of the pinion and rack gear arrangement shown in FIG. 5.

A rack gear 174, shown most clearly in FIGS. 4 and 5 is in cooperative contact with pinion gear 122 and is affixed to upwardly extending portion 162 beneath the shelf portion 138 of gripper finger 54 by means of five (5) screws 176, 178, 180, 182 and 184, as is best shown in FIGS. 4, 5 and 6. Screws 176, 180 and 184 are of the shoulder type and are threaded into rack 174 and are inserted through a clearance hole 185 (see FIG. 6). Screws 178 and 182 are set screws which are threaded into aperture 188 provided in the upwardly extending portion 162 of gripper finger 54. Set screw 178 may be provided with a resilient tip, such as nylon. By utilizing the shoulder screws together with the set screws a blind alignment may be accomplished and rack 174 may be aligned to cooperate with and be in intimate contact with pinion gear 122 with a minimum of resistance forces. Shoulder screw 176, when rotated, is capable of moving the rack away from the pinion gear 122 while set screw 188 may move the rack 174 closer to the pinion gear. By careful adjustment, one is able to align the rack in a position which is parallel to the axis of pinion gear 122 providing free movement therebetween. Thus, by providing movement to rack 174 rotation of pinion gear 122 occurs transferring the radial movement to linear movement in rack 186 which is connected in the identical manner to upwardly extending portion 188 provided on gripper finger 52. By the arrangement set forth herein it becomes obvious, that if rack 174 is to move one inch in the direction of arrow 190 (see FIG. 6) the movement will be coupled, via pinion gear 122 causing rack 186 to move in the direction of arrow 192 an equal amount in the opposite direction. Thus, driving rack 174 which is attached to gripper finger 54 by moving one inch in an outwardly direction will cause gripper fingers 52 to move an equal distance in the opposite direction, thereby making the total distance between the gripper fingers 52 and 54 equal to two inches.

Rack 186 is connected to upwardly extending portion 188 of gripper finger 52 with the aid of five (5) screws 194, 196, 198, 200 and 202. Preferably, screws 194, 198 and 202 are shoulder screws with screws 196 and 200 being set screws, all of which function in the identical manner to screws 176, 178, 180, 182 and 184 and control the alignment of rack 186. Shoulder screws 194, 198 and 202 are provided with clearance apertures in the upwardly extending portion 188 while set screws 196 and 200 are provided with threaded apertures in the upwardly extending portion 188 thereby providing identical means for alignment without being able to see the cooperating portions of the rack and pinion gears.

In lieu of a shelf portion, the upwardly extending portion 188 of gripper finger 52 is provided with an upright portion 204 which is provided with an aperture 206 into which is mounted a circulating ball bushing 208 that is adapted to receive a guide shaft 210 therein. Guide shaft 210 extends from one arm 118 of the housing 14 to the other end 120 of the housing 14 and is affixed therein by means of grooves in the identical manner as guide shaft 168. The transverse upper portion 212 of gripper finger 52 is also provided with an aperture into which is mounted a circulating ball bushing 214 thereby permitting gripper finger 52 to move freely along the guide shafts 210 and 134 in a manner similar to that of gripper finger 54 except that movement occurs in the opposite direction as explained earlier. Motion between gripper fingers 52 and 54 is linear in nature and bi-directional.

By comparing the location of the components as disclosed in FIGS. 3 and 4, it can be seen that gripper fingers 52 and 54 extend downwardly out of the housing 12 and are permitted unrestricted movement with gripper finger 54 being the driven element and gripper finger 52 being the slave element.

Referring now to FIG. 5, there is shown in cross-section gripper finger 54 which is generally hollow in nature being provided with an elongated hollow or channel 216 into which is mounted a super-slim cylinder 218 with a rectangular cross-section of the type manufactured by Festo Industries of Hauppauge, N.Y. Model No. 9505EZH2, 5/9-10. A cylinder 218 or, alternatively, an electrical solenoid is mounted in the hollow 216 with the aid of two (2) screws 220 and 222 and is provided with a rectangularly-shaped piston rod 224 and is biased by a spring 225, to its normal rest position shown in FIG. 5. Transverse pins 226 and 228, preferably roll pins, are positioned in a normal rest position to be proximate apertures 96, 98, 100 and 102. Thus, when cylinder 218 is activated (supplied with compressed air into the input nozzle 230 which is coupled, via a flexible hose 232 to the source of compressed air) by a control signal from the computer 161, the piston rod 224 will cause pins 226 and 228 to extend into the area of the tool alignment or indexing apertures 96, 98, 100 and 102. Thus, anything inserted into these indexing apertures such as tool indexing protrusions (see FIGS. 7 and 8) would be restrained therein by the force generated by the activating air.

FIGS. 7 and 8 disclose a front and side view, respectively, of a typical end effector tool 234 that may be used in conjunction with the gripper fingers 52 and 54, if it is desired to pickup a circularly-shaped object for example. As shown in the figures the end effector tool 234 includes outwardly extending protrusions 236, 238, 240 and 242 which are generally rectangularly-shaped in cross-section and are provided with the grooves 244, 246, 248 and 250, respectively, in each of the protrusions. The protrusions are selected to mate in only one way with the apertures 96, 98, 100 and 102 provided in the gripper fingers 52 and 54 to provide indexing (alignment) and are capable of being inserted on the outwardly extending surface or the inwardly extending surface of the gripper fingers. Once inserted in the apertures, activation of the cylinder 218 causes piston rod 224 to move into V-grooves 244, 246, 248 and 250 causing the end effector tool 234 to be locked into position. This is accomplished by a signal from a master control computer 161 causing the cylinder 218 to be activated at the appropriate time. The tool 234 is, therefore, locked in place until fluid pressure is removed from cylinder 218. The V-grooves provide almost perfect alignment and maintain the integrity and accuracy of the gripper fingers 52 and 54. It is to be noted that although a typical tool is shown herein, any number of tools may be utilized together with gripper fingers 52 and 54.

Typical end effector tools, of various types, are disclosed in U.S. Pat. No. 4,781,519 issued to Mathew L Monforte on Nov. 1, 1988 and U.S. Pat. No. 4,627,785 issued to Mathew L. Monforte on Dec. 9, 1986 and disclose the various end effector tools that may be utilized in an automatic production line wherein the subject robotic end effector may be used.

In operation, the robotic end effector 10 receives compressed fluid, preferably air, from a fluid source under pressure. The airflow is controlled by the master computer and an electronic signal dictates which of the input nozzles 154 or 156 is to receive the compressed fluid. Thus, the directional movement of gripper fingers 52 and 54 is determined with fluid under pressure being applied to one nozzle to cause movement of the gripper fingers in an inwardly direction, to acquire a tool, while compressed fluid being applied to the other nozzle causes the gripper fingers to move in an outwardly direction in order to acquire a different tool. Locking or releasing various end effector tools is accomplished after the robotic arm moves the end effector to a prescribed location wherein the gripper fingers are caused to acquire various and different end effector tools located in specific coordinates. Once the tools have been located and engaged in a particular manner by the indexing (alignment) arrangement, energizing piston 218 by means of a signal from the central computer 161 will lock the tool in position wherein the robotic arm then moves it to perform any number of functions.

The end effector tool disclosed herein utilizes a base portion 252 having an alignment or indexing arrangement which includes members 244, 246, 248 and 250 that is adapted to cooperate with apertures 96, 98, 100 or 102 provided on the end effector fingers 52 or 54, and a resilient portion 254 which is provided with a curved outer surface 256 ideally suited to engage a round object. By utilizing the infra-red light source 78 together with the photoelectric detector 82 the central computer can be notified when the object to be engaged interrupts the light beam occurring between gripper fingers 52 and 54. Thus, the computer can indicate and instruct the gripper fingers to close and engage the object as required, and once retained, the computer can move the robotic arm to its required position, in a conventional manner.

Hereinbefore has been disclosed a relatively simple end effector which is reliable, small in size, having a relatively large gripping dimension for its size and is ideally suitable for use on a plurality of robotic arms. It will be understood that various changes in the details, materials, arrangement of parts and operating conditions which have been herein described and illustrated in order to explain the nature of the invention may be made by those skilled in the art within the principles and scope of the instant invention.

Having thus set forth the nature of the invention, what is claimed is:

1. An end effector suitable for use on a robotic arm coupled to a central computer capable of providing an electronic command signal and a power source associated therewith, comprising, in combination:
   (a) means for removably affixing said end effector to the distal end of said robotic arm;
   (b) gripper means including;
      (i) a pair of finger members having a hollow body portion slideably retained within said end effector, said pair of finger members being adapted to be coupled, via a driving means to said power source and cooperate with and removably retain a plurality of end effector tools and components, each of said finger members being provided with at least one through aperture that functions as an indexing means, and
      (ii) first means disposed entirely within each of said hollow body portions of said finger members for locking and releasing said tools and components having cooperating protrusions extending into said through aperture upon receiving said electronic command signal; and
   (c) second means for couplinq said electronic command signal to said pair of finger members and for controlling the application of power from said power source.

2. A robotic end effector according to claim 1, further including sensing means disposed within and proximate the outwardly extending distal end of said gripper means finger members for sensing the location of an object being acquired by said gripper means finger members.

3. A robotic end effector according to claim 1, wherein each of said finger members has one end thereof coupled to said driving means operatively coupled to said power source, for providing linear bi-directional displacement of said finger members.

4. A robotic end effector according to claim 3, wherein said through aperture of each of said finger members hollow body portion is disposed proximate the distal end thereof, said first means including piston means disposed within each of said finger members hollow body portion, said piston means having a movable rod member capable of movement proximate said through aperture sufficient to capture a protrusion placed in said through aperture, and means for activating said piston means to capture said protrusion placed in each of said finger members hollow body portion through aperture.

5. A robotic end effector according to claim 3, wherein said driving means comprises a body member and a slideable rod member disposed therein, said slideable rod member being movable in both directions relative to said body member, said one end of one of said pair of finger members being affixed to said body member, means for operatively coupling said one end of the other of said pair of finger members to said rod member, thereby providing bi-directional linear motion between said pair of finger members.

6. A robotic end effector according to claim 5, wherein said means for operatively coupling said one end of the other of said pair of finger members to said rod member comprises:
   (a) a housing member, having a centrally disposed longitudinal shaft disposed therein, said shaft having a centrally disposed pinion gear disposed therein with its axis of rotation perpendicular to said shaft;
   (b) first rack gear means, said body member being affixed to said first rack gear means, said first rack gear means slideably affixed in said housing member and operatively coupled to and cooperating with said pinion gear;
   (c) second rack gear means, said one end of the other of said pair of finger members being affixed to said second rack gear means, said second rack gear means being slideably affixed in said housing member and operatively coupled to and cooperating with said pinion gear on the opposite side thereof, so that movement in one direction of said first rack gear means will cause movement in the opposite direction of said second rack gear means.

7. A robotic end effector according to claim 6, further including first and second. guide rail means disposed in said housing member parallel to said longitudinal shaft, said first guide rail means being slideably connected to one of said finger members proximate said one end of said pair of finger members to direct the movement of one of said finger members, said second guide rail means being disposed in said housing member parallel to said longitudinal shaft, said second guide rail means being slideably connected to the other of said finger members proximate said one end of said pair of finger members to direct the movement of the other of said finger members.

8. A robotic end effector according to claim 7, wherein said first and second rack gear means includes a rack gear and screw adjustment means, said screw adjustment means affixing said rack gear to said one end of each of said pair of finger members for permitting adjustment to obtain alignment with said pinion gear.

9. A robotic end effector according to claim 6, wherein said centrally disposed longitudinal shaft in cross-section comprises an I-beam.

10. An end effector suitable for use on a robotic arm associated therewith; comprising in combination:
   (a) means for removably affixing said end effector to said robotic arm, said affixing means including;
      (i) a universal mounting plate,
      (ii) a plurality of apertures disposed in said plate adapted to cooperate with apertures provided on a plurality of robotic arms, and
      (iii) means for connecting said universal mounting plate to said robotic arms;
   (b) gripper means, slideably retained within said end effector, adapted to be coupled to a power source and to a central computer capable of providing an electronic command signal, said gripper means cooperating with and removably retaining a plurality of end effector tools and components upon receiving said electronic command signal, said gripper means including;
      (i) a pair of finger members having a hollow portion, one end of said finger members being affixed to a driving means operatively coupled to said power source for providing linear, bi-directional displacement of said finger members, the other end of said finger members extending outwardly and including entirely within said hollow portion means for locking and releasing end effector tools and components responsive to said command signal; and
   (c) means for coupling said electronic command signal to said locking and releasing means for controlling the application of power from said power source.

11. An end effector suitable for use on a robotic arm coupled to a central computer capable of providing an electronic command signal and adapted to be connected to a power source, comprising, in combination:
   (a) means for removably affixing said end effector to the distal end of said robotic arm; and
   (b) gripper means including a pair of hollow finger members slideably retained within said end effector, each of said finger members including;
      (i) aperture means for mating with and removably retaining a plurality of end effector tools and components having protruding means for extending into said aperture means, and
      (ii) means disposed entirely within each of said hollow finger members, for locking and releasing said end effector tools and components from each of said finger members responsive to said electronic command signal.

* * * * *